United States Patent
Zheng et al.

(10) Patent No.: US 12,554,402 B2
(45) Date of Patent: Feb. 17, 2026

(54) DECODING AND EXECUTING MEMORY COMMAND WITH PARTIAL FRAME DATA

(71) Applicant: International Business Machines Corporation, Armonk, NY (US)

(72) Inventors: Jie Zheng, Poughkeepsie, NY (US); Stephen J. Powell, Austin, TX (US); Peter Martin Smith, Winchester (GB); Michael John Palmer, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/660,339

(22) Filed: May 10, 2024

(65) Prior Publication Data

US 2025/0348218 A1    Nov. 13, 2025

(51) Int. Cl.
*G06F 12/00* (2006.01)
*G06F 3/06* (2006.01)

(52) U.S. Cl.
CPC .......... *G06F 3/0611* (2013.01); *G06F 3/0619* (2013.01); *G06F 3/0659* (2013.01); *G06F 3/067* (2013.01)

(58) Field of Classification Search
CPC .............................. G06F 3/0613; G06F 3/0659
USPC ....................................................... 711/162
See application file for complete search history.

(56) References Cited

U.S. PATENT DOCUMENTS

| | | | |
|---|---|---|---|
| 5,796,413 A * | 8/1998 | Shipp ...................... | G09G 5/363 345/522 |
| 7,219,294 B2 * | 5/2007 | Vogt .................... | G06F 11/1004 714/758 |
| 9,838,341 B1 * | 12/2017 | Kadosh ............... | H04L 49/9084 |
| 11,042,325 B2 | 6/2021 | Zheng et al. | |
| 11,269,561 B2 | 3/2022 | Zheng et al. | |
| 2003/0172240 A1 * | 9/2003 | Johnson .................. | G06F 13/28 711/110 |
| 2005/0108611 A1 | 5/2005 | Vogt | |

(Continued)

FOREIGN PATENT DOCUMENTS

CN        101764669 A      6/2010

OTHER PUBLICATIONS

Anonymous, "Apparatus and Implementation for Optimistic Look Ahead Processing of Network Stream Data," IPCOM000201286D, IP.com, Nov. 10, 2010, 8 pages.

*Primary Examiner* — Mohamed M Gebril
(74) *Attorney, Agent, or Firm* — Cantor Colburn LLP; Edward Wixted (57) ABSTRACT

A computer-implemented method to decode and execute a memory command with partial frame data is provided. The computer-implemented method includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC.

18 Claims, 8 Drawing Sheets

(56) References Cited

U.S. PATENT DOCUMENTS

| | | | |
|---|---|---|---|
| 2005/0111389 A1* | 5/2005 | Dick | H04W 72/23 |
| | | | 370/278 |
| 2005/0268061 A1 | 12/2005 | Vogt | |
| 2012/0324209 A1* | 12/2012 | Tran | G06F 9/3806 |
| | | | 712/234 |
| 2014/0068398 A1* | 3/2014 | Zhang | H03M 13/2957 |
| | | | 714/807 |
| 2017/0012889 A1* | 1/2017 | Brown | H04L 49/9052 |
| 2019/0171361 A1* | 6/2019 | Frank | G06F 12/0223 |
| 2021/0042058 A1* | 2/2021 | Zheng | G06F 11/1004 |

\* cited by examiner

| Bits | | | | | | | | | | | | | | | |
|---|---|---|---|---|---|---|---|---|---|---|---|---|---|---|---|
| 63 | 62 | 61 | 60 | 59 | 58 | 57 | 56 | 55 | 54 | 53 | 52 | 51 | 50 | 49 | 48 |
| 47 | 46 | 45 | 44 | 43 | 42 | 41 | 40 | 39 | 38 | 37 | 36 | 35 | 34 | 33 | 32 |
| 31 | 30 | 29 | 28 | 27 | 26 | 25 | 24 | 23 | 22 | 21 | 20 | 19 | 18 | 17 | 16 |
| 15 | 14 | 13 | 12 | 11 | 10 | 9 | 8 | 7 | 6 | 5 | 4 | 3 | 2 | 1 | 0 |
| CRC(35:20) | | | | | | | | | | | | | | | |
| CRC(19:4) | | | | | | | | | | | | | | | |
| CRC(3:0) | | | | ACK Count(4:0) | | | | DL2DL ACK(1:0) | | Reserved | | | TL Template(5:4) | | |
| TL Template (3:0) | | | | Bad Data Flit(7:0) | | | | | | | | Run Length(3:0) | | | |

FIG. 4B

| Slot # | X'12' |
|---|---|
| 0 | 2-slot TL packet |
| 1 | |
| 2 | RSVD(4:0) ‖ TLX.vc3(0) ‖ TLX.vc0(3:0) ‖ TLX.dcp0(5:0) ‖ mdf1(5:0) ‖ mdf0(5:0) |
| 3 | RSVD(3:0) ‖ mdf5(5:0) ‖ mdf4(5:0) ‖ mdf3(5:0) ‖ mdf2(5:0) |
| 4 | 2-slot TL packet |
| 5 | |
| 6 | 2-slot TL packet |
| 7 | |
| 8 | 2-slot TL packet |
| 9 | |
| 10 | 2-slot TL packet |
| 11 | |
| 12 | 2-slot TL packet |
| 13 | |
| 14 | 2-slot TL packet |
| 15 | |

501

| Slot # | X'1A' |
|---|---|
| 0 | 2-slot TL packet |
| 1 | |
| 2 | 2-slot TL packet |
| 3 | |
| 4 | Data(251:0) |
| 5 | |
| 6 | |
| 7 | |
| 8 | |
| 9 | |
| 10 | |
| 11 | |
| 12 | |
| 13 | xmeta(23:0) ‖ Data(255:252) |
| 14 | Xmeta(51:24) |
| 15 | R(6:0) ‖ TLX.vc3(0) ‖ TLX.vc0(1:0) ‖ TLX.dcp0(1:0) ‖ Cmd01_PA4 ‖ Cmd23_PA4 ‖ V(1:0) ‖ xmeta(63:52) |

← Additional Address bits

DECODING AND EXECUTING MEMORY COMMAND WITH PARTIAL FRAME DATA

BACKGROUND

The present invention generally relates to computing systems. More specifically, the present invention relates to a method to decode and execute a memory command with partial frame data.

Synchronous dynamic random access memory (SDRAM) is often used as primary processor memory in modern computers. During a memory access operation, a memory controller issues a bank activate command and a read command to perform a read operation and data retrieval from a DRAM. The bank activate command designates a row of the DRAM containing a line to be accessed and the read command specifies a column to be accessed. Both the bank activate command and the read command are serial processes. As serial processes, scheduling of the bank activate and read commands affects how quickly data can be returned to a host that requested the stored data.

The memory controller in a distributed memory subsystem is conventionally located on a separate microchip than core compute blocks of a processor. A memory request may be transmitted over a number of cycles on a narrow, high-speed channel. Cyclic redundancy check (CRC) processes are often applied over an entire data packet to ensure correctness. Translation and decoding of the entire packet, along with processing associated with the CRC, queuing and other timing considerations require multiple processor cycles that can slow the memory access operation.

SUMMARY

According to an aspect of the disclosure, a computer-implemented method to decode and execute a memory command with partial frame data is provided. The computer-implemented method includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC. This reduces latency in a distributed memory subsystem.

According to an aspect of the disclosure, a computer program product to decode and execute a memory command with partial frame data is provided. The computer program product includes one or more computer readable storage media having computer readable program code collectively stored on the one or more computer readable storage media. The computer readable program code is executed by a processor of a computer system to cause the computer system to perform a method. The method includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC. This reduces latency in a distributed memory subsystem.

According to an aspect of the disclosure, a computing system is provided and includes a processor, a memory coupled to the processor and one or more computer readable storage media coupled to the processor. The one or more computer readable storage media collectively contain instructions that are executed by the processor via the memory to implement a method to decode and execute a memory command with partial frame data. The method to decode and execute a memory command with partial frame data includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC. This reduces latency in a distributed memory subsystem.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

According to an aspect of the disclosure, a computer-implemented method to decode and execute a memory command with partial frame data is provided. The computer-implemented method includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC. This reduces latency in a distributed memory subsystem.

In accordance with additional or alternative embodiments, the method further includes scheduling the verified command to be sent to dynamic random access memory (DRAM) for execution of the verified command with respect to the DRAM.

In accordance with additional or alternative embodiments, the early cycles of the frame include a packet including a tag, the opcode and a command address which serve to identify a template in which the frame is formatted.

In accordance with additional or alternative embodiments, the method further includes reserving space for the full address bits in a template determined by the opcode in case a system configuration requires an excessive number of address bits.

In accordance with additional or alternative embodiments, the memory command is a write command or a read command that can be acted upon in earlier cycles that would be otherwise possible.

In accordance with additional or alternative embodiments, the method further includes expanding the command FIFO unit to account for a maximum number of outstanding unverified commands.

In accordance with additional or alternative embodiments, the method further includes dropping the unverified command from the command FIFO unit based on errors being found during the CRC to avoid proceeding with the execution of the unverified command.

According to an aspect of the disclosure, a computer program product to decode and execute a memory command with partial frame data is provided. The computer program product includes one or more computer readable storage media having computer readable program code collectively stored on the one or more computer readable storage media. The computer readable program code is executed by a processor of a computer system to cause the computer system to perform a method. The method includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC. This reduces latency in a distributed memory subsystem.

In accordance with additional or alternative embodiments, the method further includes scheduling the verified command to be sent to dynamic random access memory (DRAM) for execution of the verified command with respect to the DRAM.

In accordance with additional or alternative embodiments, the early cycles of the frame include a packet including a tag, the opcode and a command address which serve to identify a template in which the frame is formatted.

In accordance with additional or alternative embodiments, the method further includes reserving space for the full address bits in a template determined by the opcode in case a system configuration requires an excessive number of address bits.

In accordance with additional or alternative embodiments, the memory command is a write command or a read command that can be acted upon in earlier cycles that would be otherwise possible.

In accordance with additional or alternative embodiments, the method further includes expanding the command FIFO unit to account for a maximum number of outstanding unverified commands.

In accordance with additional or alternative embodiments, the method further includes dropping the unverified command from the command FIFO unit based on errors being found during the CRC to avoid proceeding with the execution of the unverified command.

According to an aspect of the disclosure, a computing system is provided and includes a processor, a memory coupled to the processor and one or more computer readable storage media coupled to the processor. The one or more computer readable storage media collectively contain instructions that are executed by the processor via the memory to implement a method to decode and execute a memory command with partial frame data. The method to decode and execute a memory command with partial frame data includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC. This reduces latency in a distributed memory subsystem.

In accordance with additional or alternative embodiments, the method to decode and execute a memory command with partial frame data further includes scheduling the verified command to be sent to dynamic random access memory (DRAM) for execution of the verified command with respect to the DRAM.

In accordance with additional or alternative embodiments, the early cycles of the frame include a packet including a tag, the opcode and a command address which serve to identify a template in which the frame is formatted.

In accordance with additional or alternative embodiments, the method to decode and execute a memory command with partial frame data further includes reserving space for the full address bits in a template determined by the opcode in case a system configuration requires an excessive number of address bits.

In accordance with additional or alternative embodiments, the memory command is a write command or a read command that can be acted upon in earlier cycles that would be otherwise possible.

In accordance with additional or alternative embodiments, the method to decode and execute a memory command with partial frame data further includes expanding the command FIFO unit to account for a maximum number of outstanding unverified commands.

In accordance with additional or alternative embodiments, the method to decode and execute a memory command with partial frame data further includes dropping the unverified command from the command FIFO unit based on errors being found during the CRC to avoid proceeding with the execution of the unverified command.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
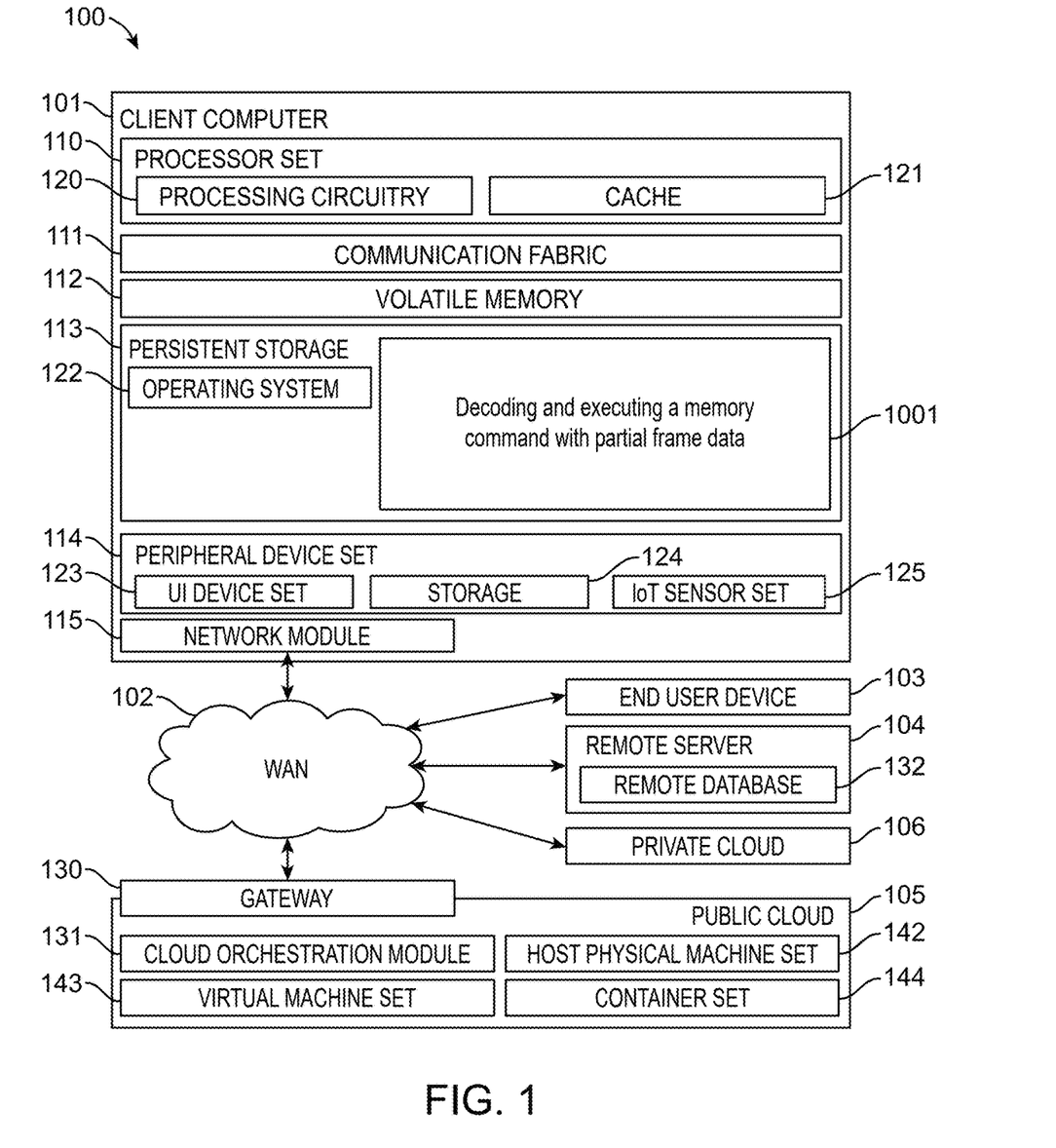
FIG. 1 is a schematic diagram of a computing environment for automated floorplan assistance in accordance with one or more embodiments.

With reference to FIG. 1, a computer or computing device 100 that implements a computer-implemented method to decode and execute a memory command with partial frame data. The computer or computing device 100 of FIG. 1 contains an example of an environment for the execution of at least some of the computer code involved in performing the inventive methods, such as the block 1001 of the computer-implemented method to decode and execute a memory command with partial frame data. In addition to the computer-implemented method to decode and execute a memory command with partial frame data of block 1001, the computer or computing device 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the computer-implemented method of block 1001, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of the computer-implemented method, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

The processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In the computer-implemented method, at least some of the instructions for performing the inventive methods may be stored in the block 1001 of the computer-implemented method in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the block 1001 of the computer-implemented method typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Turning now to an overview of technologies that are more specifically relevant to aspects of the invention, latency is a crucial factor in any high-performance computing system design. A cyclic redundancy check (CRC) is used to protect a frame of a command that is transmitted through an interface, such as a high-speed interface. Typically, the command is decoded and executed after the CRC. However, it has been found that differential errors rarely happen. Indeed, in some cases, error rates can be as low as one error in $10^{12}$ frames. Despite these low error rates, conventional high-performance computing designs require the CRC to complete prior to decoding and execution of a command, which leads to increased latency.

The above-described aspects of the invention address the shortcomings of the prior art by providing a computer-implemented method to decode and execute a memory command with partial frame data whereby memory command execution in expedited prior to the CRC. This allows a scheduler to issue early activation to reduce latency, increases a chance of selecting high priority commands to activate, provides for increased numbers of banks to activate to cover row-to-column delays (tRCDs), provides for increased numbers of selections for favoring a same rank as a last activation and provides increased numbers of selections for favoring a different bank group on a same rank.

The computer-implemented method to decode and execute a memory command with partial frame data includes receiving the memory command during early cycles of a frame, the memory command being locatable in a template of the frame by reference to an opcode of the frame, sending the memory command to a command first-in-first-out (FIFO) unit as an unverified command once decoder logic decodes the memory command, prior to a cyclic redundancy check (CRC) and prior to arrival of full address bits of the frame in later cycles, entering the unverified command into a scheduling queue to allow for early bank activation, executing the CRC and confirming the unverified command as a verified command based on no errors being found during the CRC.

In addition, a method for decoding and executing a memory command with partial frame data is provided. The method includes using a unique opcode to determine a template with partial frame data, speculatively assigning a write buffer pointer for an unverified write command, expanding a command FIFO to allow any unverified read or write command to consume FIFO resources, accumulating host resource credit for the unverified write command and for an unverified read command, returning the host resource credit after a successful CRC for a frame, allowing the unverified command to be executed without a complete command address, sparing space in the frame for a late arriving command address, which is fully populated when the command is verified, allowing the unverified command to participate in a memory scheduler activation selection process and allowing the memory scheduler to issue an activate command using the unverified command.

Figure 2:
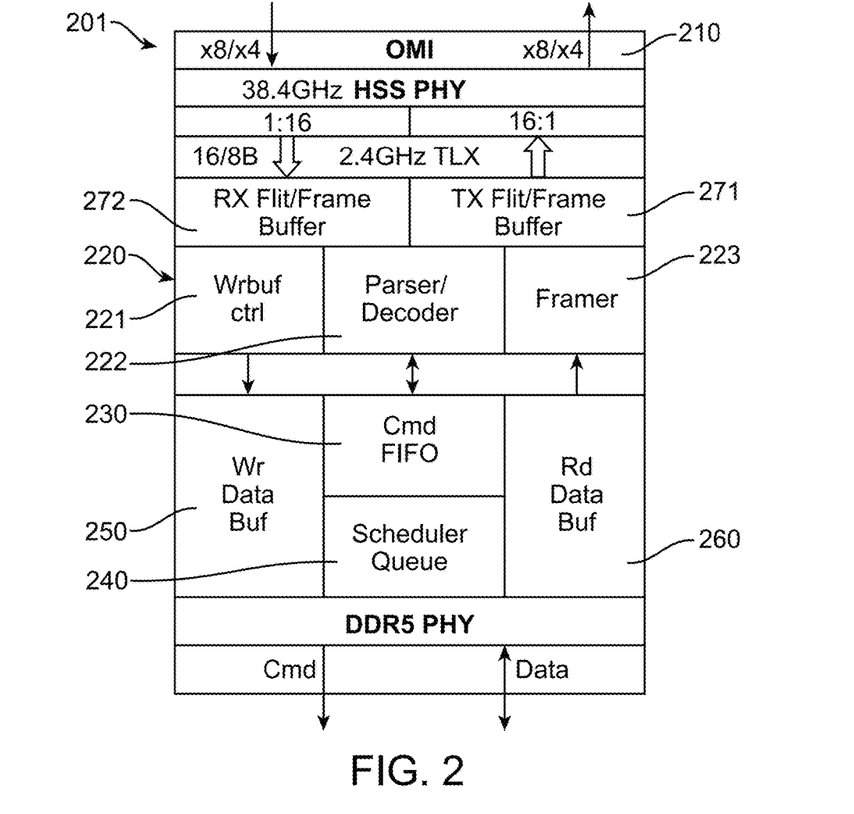
FIG. 2 is a schematic diagram of a memory buffer chip in accordance with one or more embodiments.

With reference to FIG. 2, a memory buffer (MB) chip 201 is provided at a high-level view. The memory buffer chip 201 includes an open memory interface (OMI) 210, a transaction layer 220, a command FIFO unit 230, a scheduler queue 240, a write data buffer 250 and a read data buffer 260. The transaction layer 220 includes a write buffer control unit 221, a parser decoder 222 and a frame assembler 223 that assembles a frame, which, upon assembly, is pushed into a frame buffer 271 to then be sent to the host. On a receiving end, a partial frame is received and placed into a frame buffer 272 as well (there are two different frame buffers, the frame buffer 272 on the receiving end and the frame buffer 271 on the transmit end). The FIFO unit 230 has resources which are consumable by the host and available resource credit that can be returned by the MB chip 201. The scheduler queue 240 is configured to schedule memory commands to DRAM.

In a conventional case, the OMI 210 can use a high-speed physical interface (i.e., a high-speed serdes phy or HSS PHY). The OMI 210 can be configured to use x8 or x4 lanes. After a 1:16 frequency conversion, the transaction layer 220 in a slower frequency domain receives 16 bytes out of a 64 byte frame each cycle in an x8 configuration or 8 bytes out of a 64 byte frame each cycle in an x4 configuration. Partial frame data is assembled in the frame buffer 272 and a command is decoded when an entire 64 byte frame has arrived. The command is then pushed into the command FIFO unit 230, whose resources are managed by the host. After the command leaves the command FIFO unit 230 and enters the scheduler queue 240, resource credit is returned to the host. The scheduler queue 240 will schedule the best available command to be issued to DRAM.

Figure 3A:
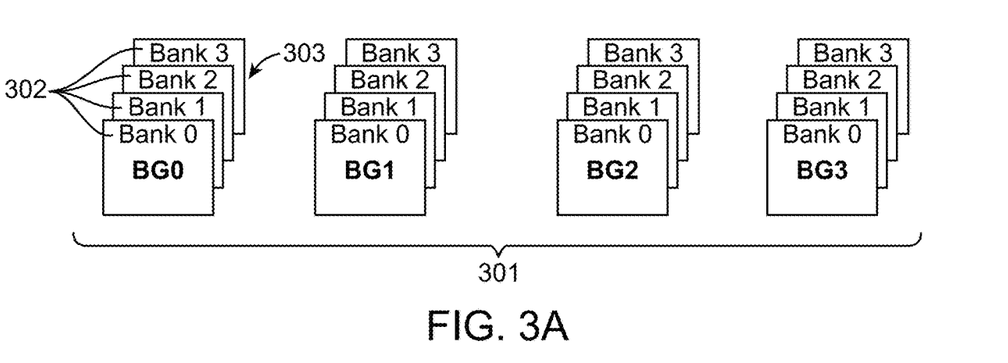
FIG. 3A is a schematic diagram of a memory back in accordance with one or more embodiments.
Figure 3B:
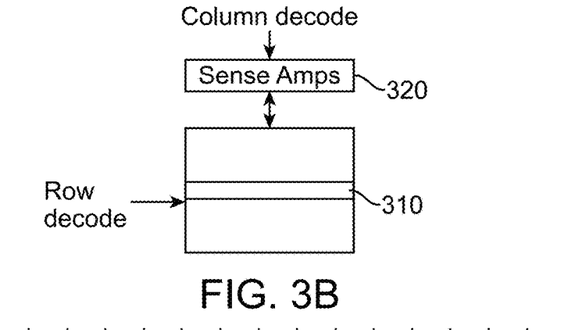
FIG. 3B is a schematic illustration of a decoding of a target line and a column of a memory bank in accordance with one or more embodiments.
Figure 3C:
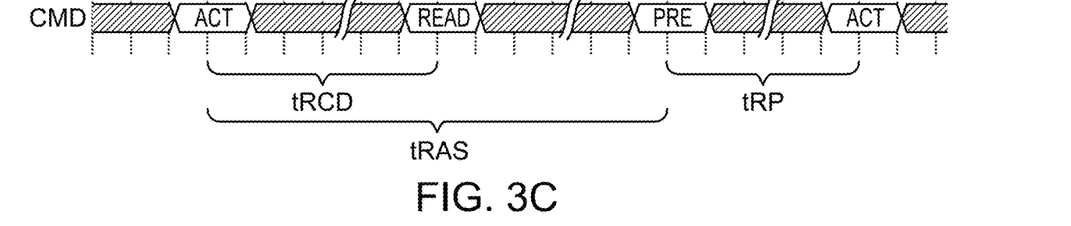
FIG. 3C is a schematic illustration of a sequence of certain commands in accordance with one or more embodiments.

With reference to FIGS. 3A, 3B and 3C, a memory array 301 is provided and is divided into banks 302 and bank groups 303. After a bank 302 is selected using a bank and bank group address, a row address selects a target line 310 from the bank 302 and is loaded into a sense amplifier 320 whereupon a column address is used to selects a target location. The command used to select the target line 310 from the bank 302 and load it into the sense amplifier 320 is referred to as an activate command or "ACT cmd." Following a tRCD, a read or write command can be issued to retrieve or store data from/to the target line 310 in the sense amplifier 320. A precharge command can be used to push the data from the sense amplifier 320 back to the memory array 301. It is to be understood that the earlier the ACT cmd can be issued, the smaller a data retrieval latency there will be. The following description will illustrate that, in accordance with one or more embodiments, the ACT cmd is issued earlier than normal and the scheduler queue 240 of FIG. 2 is afforded more opportunity to select the best available commands to issue.

Figure 4A:
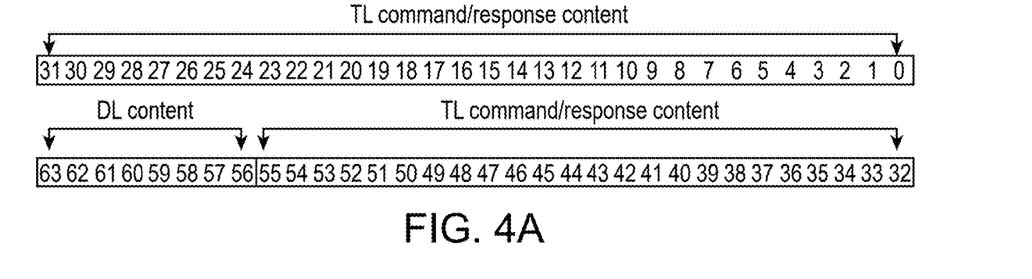
FIG. 4A is an example of a frame sent to a memory buffer chip in accordance with one or more embodiments.
Figure 4B:
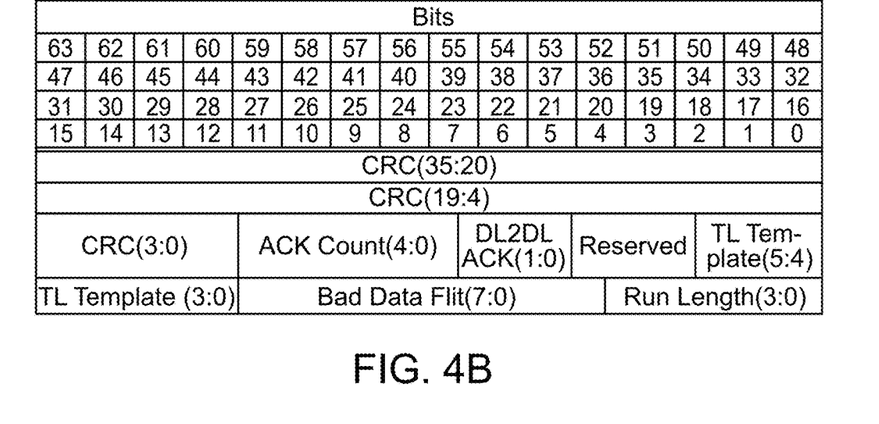
FIG. 4B is a graphical illustration of a data layer content of the frame of FIG. 4A in accordance with one or more embodiments.

With reference to FIGS. 4A and 4B, a conventional format of a frame that is sent to the MB chip 201 from the OMI interface 210 is illustrated along with a form of data layer (DL) content of the frame. As shown, a 64 byte frame includes 56 bytes of command content and 8 bytes of DL content. A CRC for the frame is in the DL content and arrives during a last cycle of the frame. In the x8 link configuration, four cycles are required to receive the 64 byte frame and eight cycles are required to receive the 64 byte frame in the x4 link configuration. The 56 bytes of command content can be further broken down into 16 slots that can be arranged in different formats to meet design requirements. The different arrangements of the slots is defined as a template of the frame.

Figure 5A:
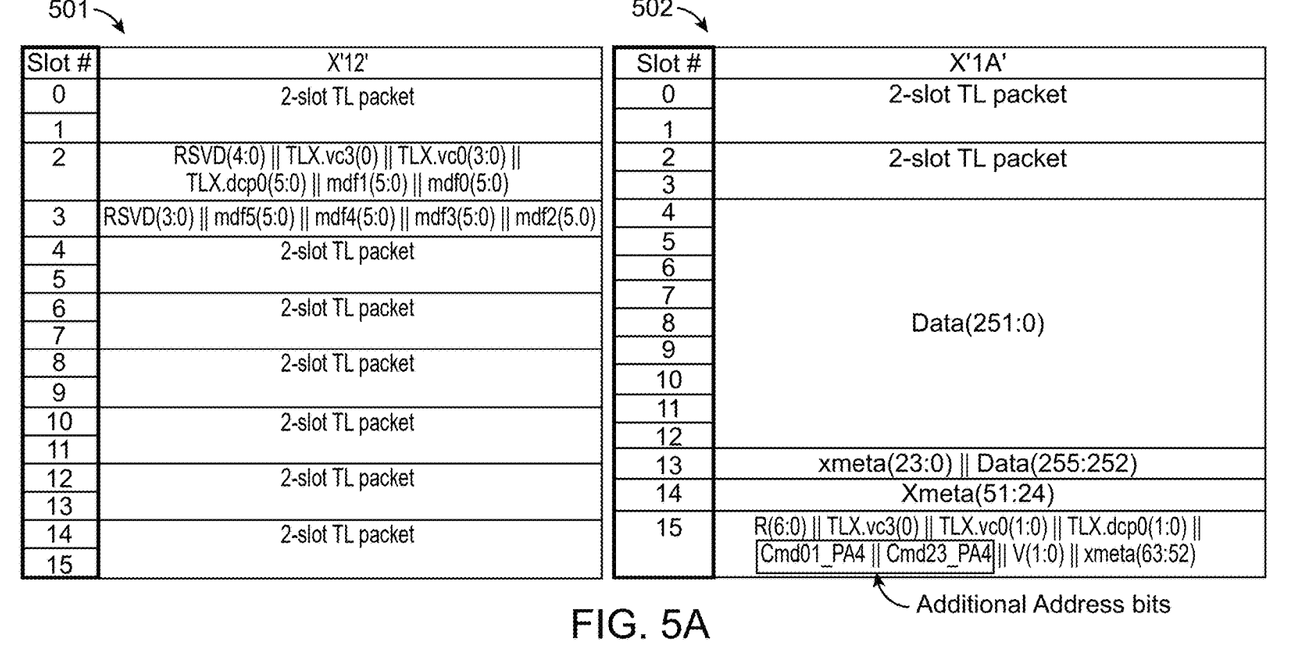
FIG. 5A are examples of templates for a frame in accordance with one or more embodiments.
Figure 5B:
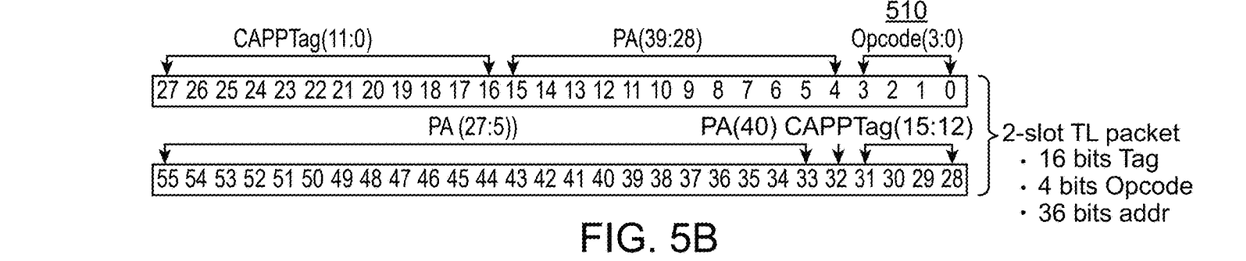
FIG. 5B illustrates contents of a slot of one of the templates of FIG. 5A in accordance with one or more embodiments.

With reference to FIGS. 5A and 5B, templates 501 and 502 have been defined to design requirements in accordance with one or more embodiments. Template 501 is in an "x12" format and template 502 in is an "x1A" format. As shown in FIG. 5A, for template 501, a command can be packed into the 2-slot as a packet that includes a 16 bit tag, a 4 bit opcode and a 36 bit command address. Additional address bits can be carried as spare bits in the 15-slot in template 502. As shown in FIG. 5B, the opcode 510 is to identify locations of possible commands. If the template 501 of FIG. 5A were sent in a conventional system, it would take 8 cycles for the entire 64 byte frame to arrive, the earliest time the first command could be sent into the command FIFO unit 230 of FIG. 2 would be during the 8th cycle and the earliest the scheduler queue 240 of FIG. 2 could execute the command would be during the 9th cycle.

Figure 6A:
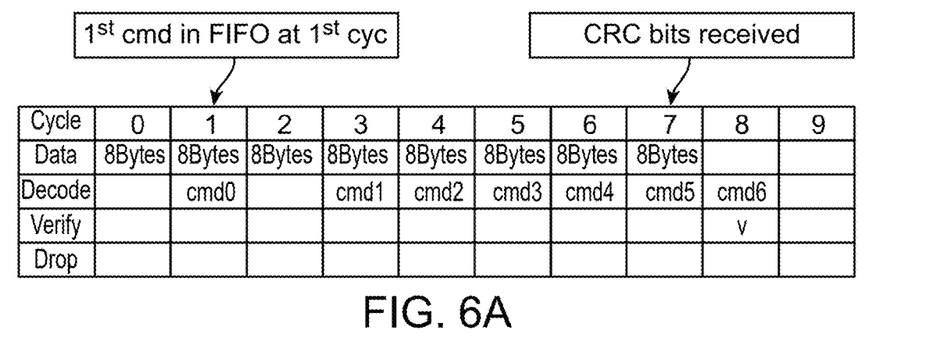
FIG. 6A is a schematic illustration of a format of a frame in accordance with one or more embodiments.
Figure 6B:
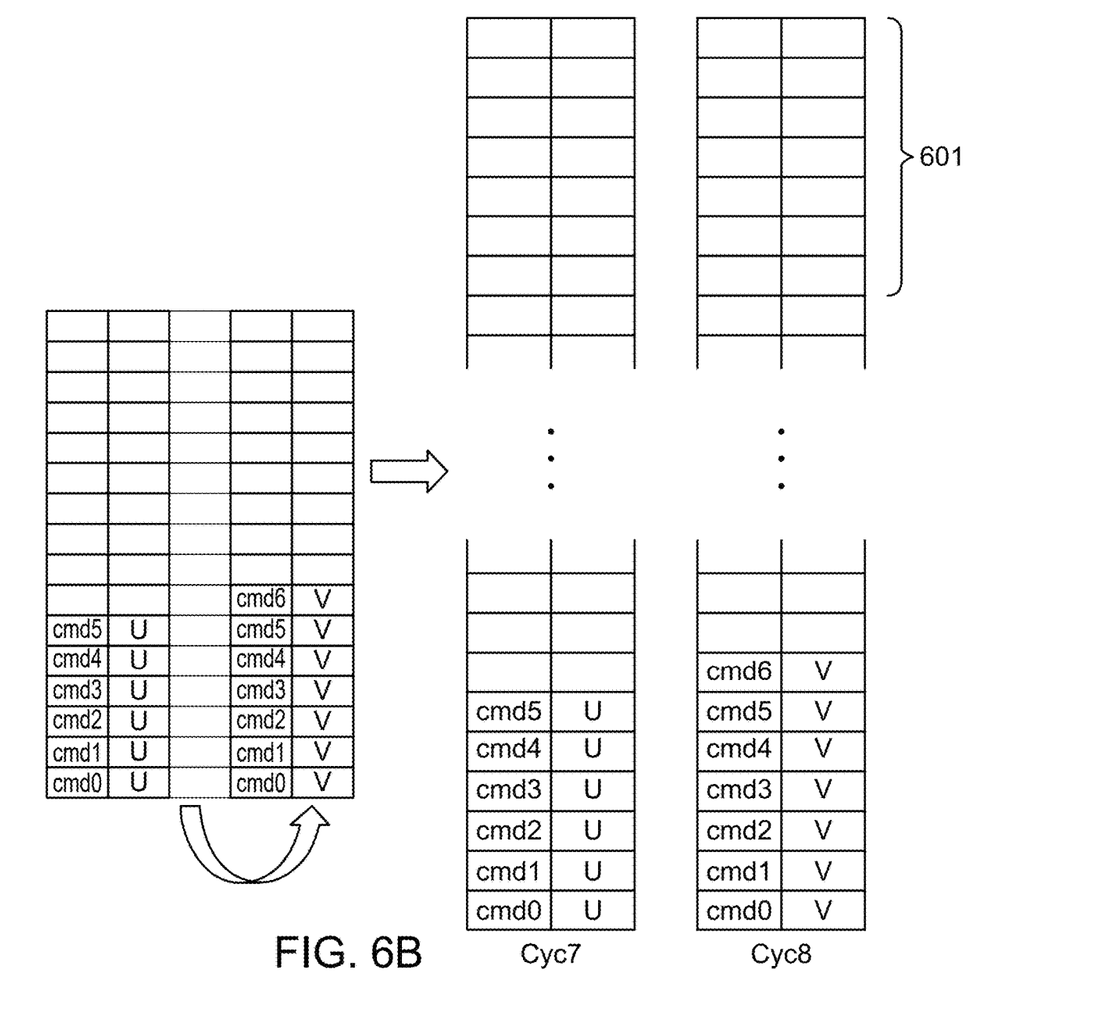
FIG. 6B is a schematic illustration of a command FIFO unit in accordance with one or more embodiments.

With reference to FIGS. 6A and 6B and in accordance with one or more embodiments, based on the opcode 510 of FIG. 5B being received in cycle0, the first command can be decoded without waiting for the CRC and it becomes possible to push the first command into the command FIFO unit 230 of FIG. 2 in cycle1 whereupon it is available for the scheduler queue 240 of FIG. 2 during cycle2. This allows the scheduler queue 240 to issue the ACT cmd early and to thereby reduce latency.

When the first command is pushed into the command FIFO unit 230 of FIG. 2 prior to the CRC, it can be referred to as an unverified command U as shown in FIG. 6B. Each command, including the first command (i.e., the unverified command) can be associated with a qualifier bit that is indicative of whether the command has been verified. At cycle7, once CRC bits have arrived, the entire frame can be checked for a CRC error and, if no CRC error is found, a verified pulse can be issued to all of the unverified commands in the command FIFO unit 230 queue. The qualifier bit can then be switched from being indicative of an unverified command to being a V as shown in FIG. 6B and indicative of the command being verified. In an event the CRC reveals an error, a discard pulse can be issued to all unverified commands in the command FIFO unit 230 queue and the command in question can be removed from the command FIFO unit 230 queue and from the scheduler queue 240.

The write data buffer 250 of FIG. 2 can be assigned speculatively for unverified write commands and a data buffer pointer manager will recycle the write data buffer pointer if the command is being dropped due to a CRC error being found. Because of the possibility of commands being decoded incorrectly, the command FIFO unit 230 of FIG. 2 is expanded by a certain number of entries 601 (i.e., seven entries 601) to account for a maximum number of unverified commands being outstanding which can occupy resources of the command FIFO unit 230.

Figure 7:
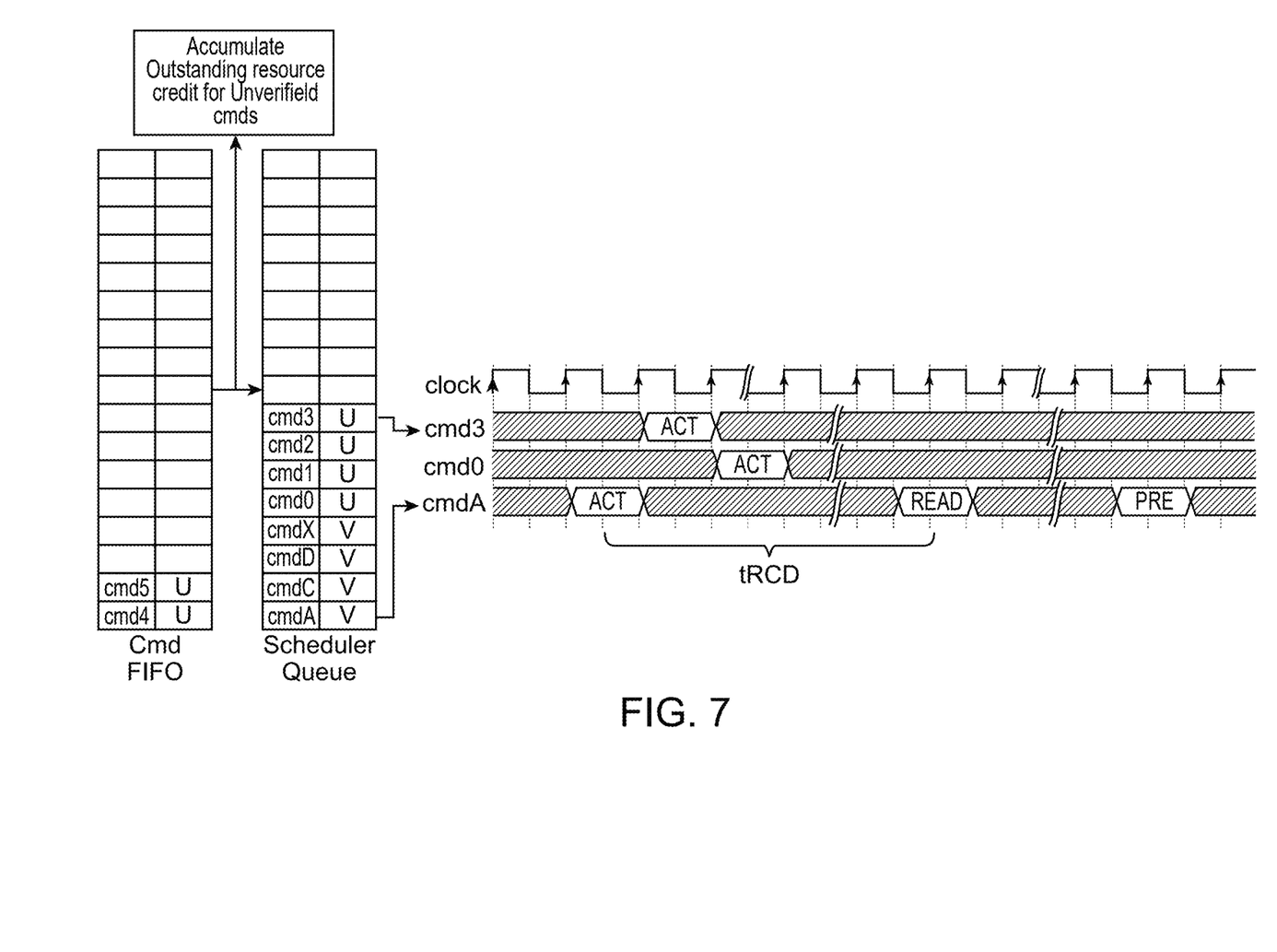
FIG. 7 is a schematic illustration of a sequence of command executions in accordance with one or more embodiments.

With reference to FIG. 7, resource credit of the command FIFO unit 230 of FIG. 2 does not get returned to the host immediately following an unverified command leaving the command FIFO unit 230. Instead, the command FIFO unit 230 will accumulate outstanding resource credits for unverified commands that leave the command FIFO unit 230 and only return the resource credits after a command is verified by a CRC that does not find an error. Thus, if commands are dropped due to there being a CRC error, no resource credit is returned to host.

After unverified commands enter the scheduler queue 240 of FIG. 2, the unverified commands can participate in activation selection processes immediately. As shown in FIG. 7, the scheduler queue 240 is allowed to activate unverified cmd3 and cmd0. However, the scheduler queue 240 is only allowed to issue the read command after the command is verified. If an activated command is subsequently dropped due to a CRC error being found, the scheduler queue 240 will close the activated bank after DRAM timing is satisfied.

Figure 8:
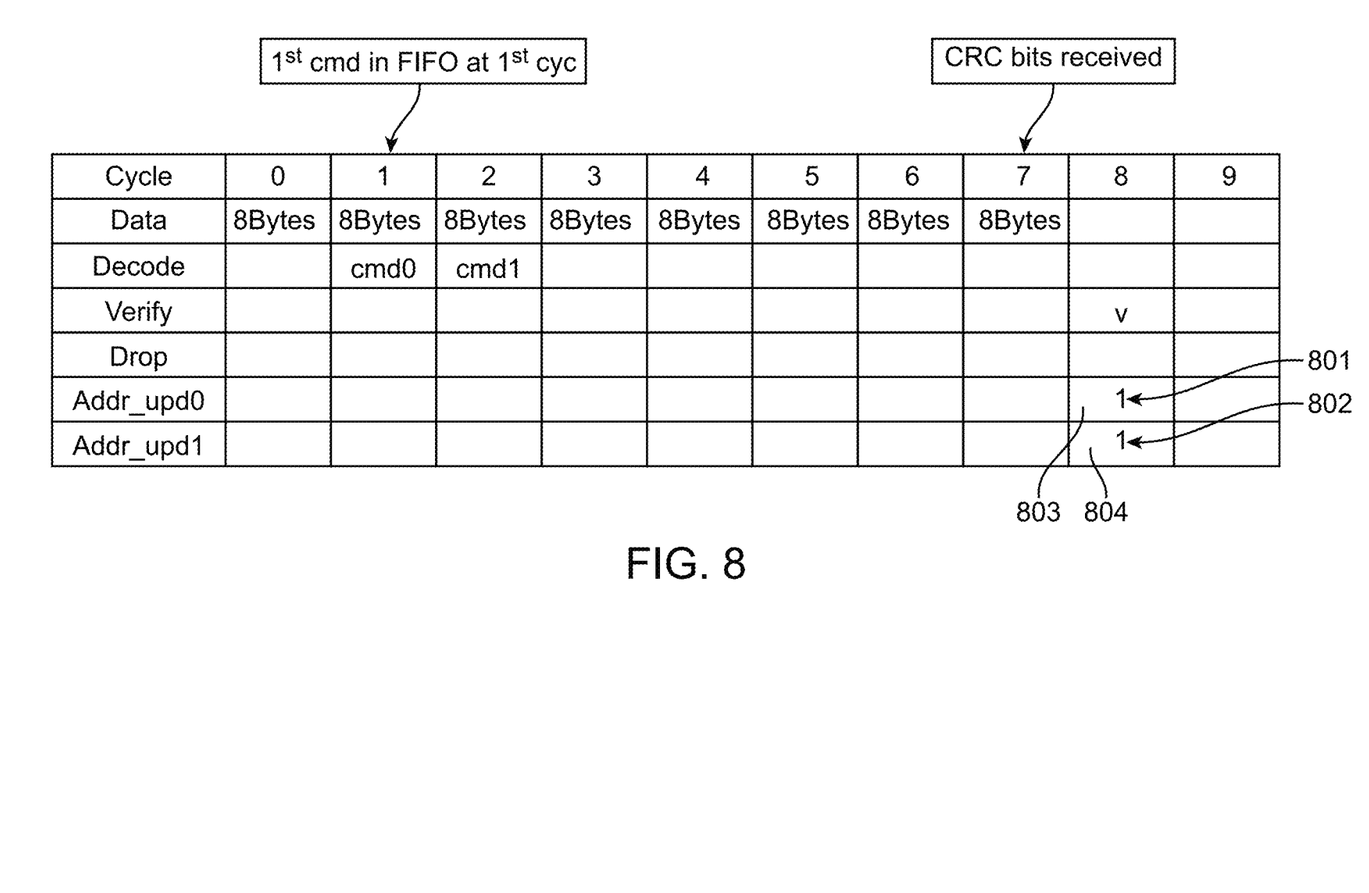
FIG. 8 is a schematic illustration of a format of a frame with reserved space in accordance with one or more embodiments.

With reference to FIG. 8 and in accordance with one or more alternate embodiments, in a system configuration requiring more than 36 address bits where a 2-slot packet is insufficient and remaining address bits are packed in a tail end of a frame, it is possible to update an address field of unverified commands during the cycle of the CRC. As shown in FIG. 8, two address bits 801 and 802 (one for each command) can be packed into spare spots 803 and 804, respectively, toward the end of the frame which are reserved for late arriving address bits.

Figure 9:
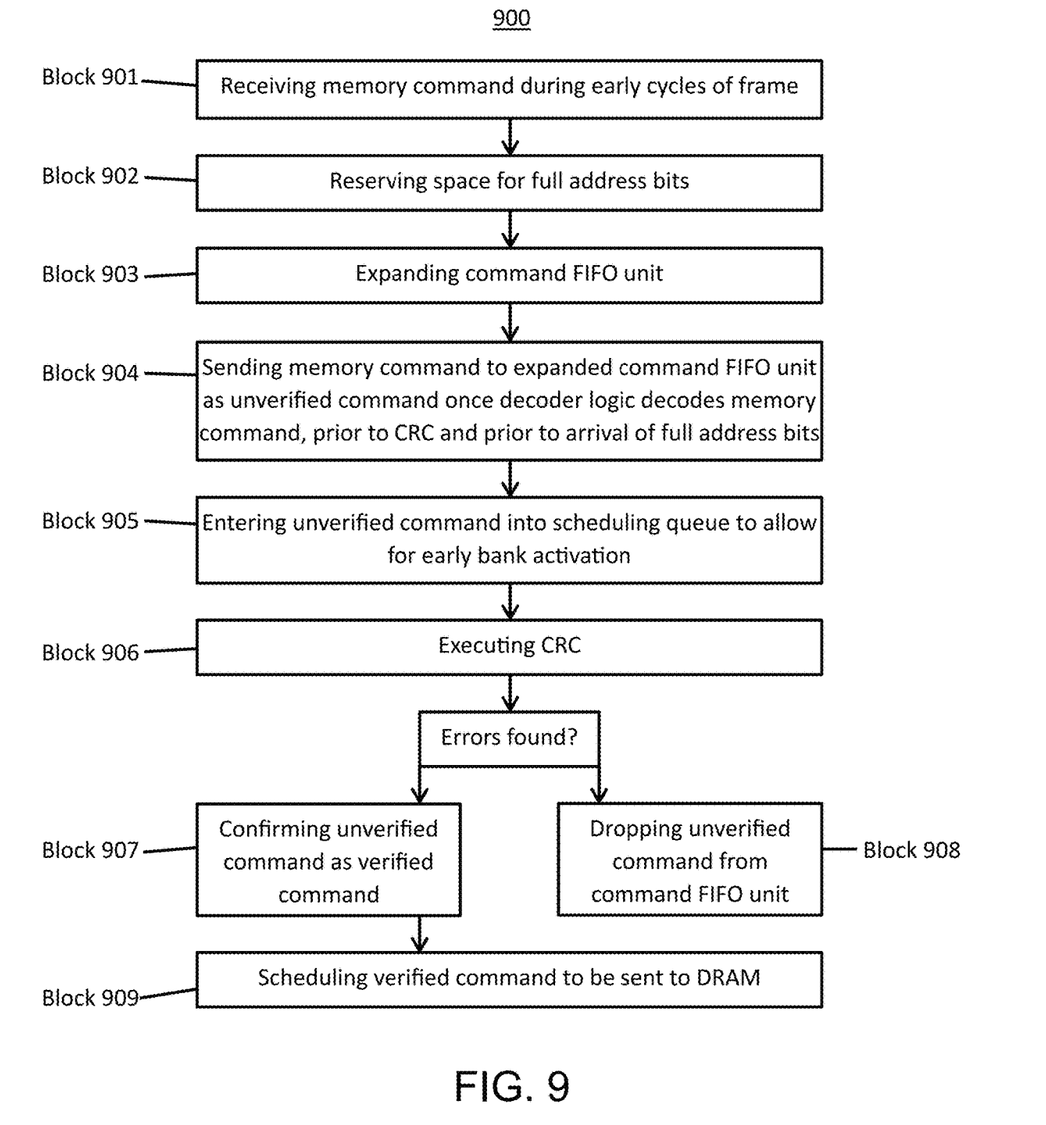
FIG. 9 is a flow diagram illustrating a computer-implemented method to decode and execute a memory command with partial frame data in accordance with one or more embodiments.

With reference to FIG. 9, a computer-implemented method 900 is provided to decode and execute a memory command (i.e., a write command) with partial frame data as described above. As shown in FIG. 9, the computer-implemented method 900 includes receiving the memory command during early cycles of a frame (block 901), where the memory command is locatable in a template of the frame by reference to an opcode of the frame. The early cycles of the frame can include a 2-slot packet, which in turn includes a 16 bit tag, the opcode provided as a 4 bit opcode and a 36 bit command address. The computer-implemented method 900 also includes reserving space for the full address bits in a template determined by the 4 bit opcode (block 902). The computer-implemented method 900 further includes expanding a command FIFO unit (block 903), sending the memory command to the expanded command FIFO unit as an unverified command once decoder logic decodes the memory command, prior to a CRC and prior to arrival of full address bits of the frame in later cycles (block 904), entering the unverified command into a scheduling queue to allow for early bank activation (block 905), executing the CRC (block 906) and either confirming the unverified command as a verified command based on no errors being found during the CRC (block 907) or dropping the unverified command from the command FIFO unit based on errors being found during the CRC (block 908). In addition, the computer-implemented method 900 also includes scheduling the verified command to be sent to DRAM (block 909).

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A non-transitory computer-implemented method to decode and execute a memory command with partial frame data, the computer-implemented method comprising:
   receiving the memory command during early cycles of a frame, the memory command being locatable in a template of the frame by reference to an opcode of the frame;
   sending the memory command to a command first-in-first-out (FIFO) unit as an unverified command once decoder logic decodes the memory command, prior to a cyclic redundancy check (CRC) and prior to arrival of full address bits of the frame in later cycles, wherein the later cycles follow the early cycles;
entering the unverified command into a scheduling queue to allow for early-bank activation;
executing the CRC; and
confirming the unverified command as a verified command based on no errors being found during the CRC,
wherein:
the early cycles of the frame comprise a 2-slot packet comprising a 16 bit tag, the opcode provided as a 4 bit opcode and a 36 bit command address, and
the non-transitory computer-implemented method further comprises reserving space for the full address bits in a template determined by the 4 bit opcode and, with the opcode provided as the 4 bit opcode being received in the 2-slot packet during the early cycles, decoding the memory command without waiting for the CRC.

2. The non-transitory computer-implemented method according to claim 1, further comprising scheduling the verified command to be sent to dynamic random access memory (DRAM).

3. The non-transitory computer-implemented method according to claim 1, wherein the memory command is a write command.

4. The non-transitory computer-implemented method according to claim 1, further comprising expanding the command FIFO unit by a number of entries to account for a maximum number of unverified commands,
wherein:
the command FIFO unit accumulates resource credits for unverified commands that leave the command FIFO unit and only returns the resource credits after a command is verified by an executing of the CRC that does not find an error, and
the scheduling queue is configured to activate unverified commands and to issue a read command only after the read command is verified.

5. The non-transitory computer-implemented method according to claim 1, further comprising dropping the unverified command from the command FIFO unit based on errors being found during the CRC.

6. A computer program product to decode and execute a memory command with partial frame data, the computer program product comprising one or more non-transitory computer readable storage media having computer readable program code collectively stored on the one or more computer readable storage media, the computer readable program code being executed by a processor of a computer system to cause the computer system to perform a method comprising:
receiving the memory command during early cycles of a frame, the memory command being locatable in a template of the frame by reference to an opcode of the frame;
sending the memory command to a command first-in-first-out (FIFO) unit as an unverified command once decoder logic decodes the memory command, prior to a cyclic redundancy check (CRC) and prior to arrival of full address bits of the frame in later cycles, wherein the later cycles follow the early cycles;
entering the unverified command into a scheduling queue to allow for bank activation;
executing the CRC; and
confirming the unverified command as a verified command based on no errors being found during the CRC,
wherein:
the early cycles of the frame comprise a 2-slot packet comprising a 16 bit tag, the opcode provided as a 4 bit opcode and a 36 bit command address, and
the non-transitory computer-implemented method further comprises reserving space for the full address bits in a template determined by the 4 bit opcode and, with the opcode provided as the 4 bit opcode being received in the 2-slot packet during the early cycles, decoding the memory command without waiting for the CRC.

7. The computer program product according to claim 6, wherein the method further comprises scheduling the verified command to be sent to dynamic random access memory (DRAM).

8. The computer program product according to claim 6, wherein the memory command is a write command.

9. The computer program product according to claim 6, wherein the method further comprises expanding the command FIFO unit by a number of entries to account for a maximum number of unverified commands,
wherein:
the command FIFO unit accumulates resource credits for unverified commands that leave the command FIFO unit and only returns the resource credits after a command is verified by an executing of the CRC that does not find an error, and
the scheduling queue is configured to activate unverified commands and to issue a read command only after the read command is verified.

10. The computer program product according to claim 6, wherein the method further comprises dropping the unverified command from the command FIFO unit based on errors being found during the CRC.

11. A computing system comprising:
a processor;
a memory coupled to the processor; and
one or more non-transitory computer readable storage media coupled to the processor, the non-transitory one or more computer readable storage media collectively containing instructions that are executed by the processor via the memory to implement a method to decode and execute a memory command with partial frame data comprising:
receiving the memory command during early cycles of a frame, the memory command being locatable in a template of the frame by reference to an opcode of the frame;
sending the memory command to a command first-in-first-out (FIFO) unit as an unverified command once decoder logic decodes the memory command, prior to a cyclic redundancy check (CRC) and prior to arrival of full address bits of the frame in later cycles, wherein the later cycles follow the early cycles;
entering the unverified command into a scheduling queue to allow for early bank activation;
executing the CRC; and
confirming the unverified command as a verified command based on no errors being found during the CRC,
wherein:
the early cycles of the frame comprise a 2-slot packet comprising a 16 bit tag, the opcode provided as a 4 bit opcode and a 36 bit command address, and
the non-transitory computer-implemented method further comprises reserving space for the full address bits in a template determined by the 4 bit opcode and, with the opcode provided as the 4 bit opcode being received in the 2-slot packet during the early cycles, decoding the memory command without waiting for the CRC.

12. The computing system according to claim 11, wherein the method further comprises scheduling the verified command to be sent to dynamic random access memory (DRAM).

13. The computing system according to claim 11, wherein the memory command is a write command.

14. The computing system according to claim 11, wherein the method to decode and execute a memory command with partial frame data further comprises expanding the command FIFO unit by a number of entries to account for a maximum number of unverified commands,
wherein:
the command FIFO unit accumulates resource credits for unverified commands that leave the command FIFO unit and only returns the resource credits after a command is verified by an executing of the CRC that does not find an error, and
the scheduling queue is configured to activate unverified commands and to issue a read command only after the read command is verified.

15. The computing system according to claim 11, wherein the method to decode and execute a memory command with partial frame data further comprises dropping the unverified command from the command FIFO unit based on errors being found during the CRC.

16. The non-transitory computer-implemented method according to claim 1, further comprising:
reserving spare spots toward an end of the frame for late arriving address bits; and
storing the late arriving address bits in the spare spots during the executing of the CRC.

17. The computer program product according to claim 6, wherein the method further comprises:
reserving spare spots toward an end of the frame for late arriving address bits; and
storing the late arriving address bits in the spare spots during the executing of the CRC.

18. The computing system according to claim 11, wherein the method further comprises:
reserving spare spots toward an end of the frame for late arriving address bits; and
storing the late arriving address bits in the spare spots during the executing of the CRC.

* * * * *